US007793308B2

(12) United States Patent
Gusler et al.

(10) Patent No.: US 7,793,308 B2
(45) Date of Patent: Sep. 7, 2010

(54) SETTING OPERATION BASED RESOURCE UTILIZATION THRESHOLDS FOR RESOURCE USE BY A PROCESS

(75) Inventors: Carl Phillip Gusler, Austin, TX (US);
Rick Allen Hamilton, II, Charlottesville, VA (US); James W. Seaman, Falls Church, VA (US); Timothy Moffett Waters, Hiram, GA (US)

(73) Assignee: International Business Machines Corporation, Armonk, NY (US)

( * ) Notice: Subject to any disclaimer, the term of this patent is extended or adjusted under 35 U.S.C. 154(b) by 1478 days.

(21) Appl. No.: 11/031,426

(22) Filed: Jan. 6, 2005

(65) Prior Publication Data
US 2006/0150190 A1    Jul. 6, 2006

(51) Int. Cl.
*G06F 3/00*   (2006.01)
*G06F 1/04*   (2006.01)
*G06F 7/00*   (2006.01)

(52) U.S. Cl. .................. 719/328; 713/502; 707/705
(58) Field of Classification Search ................ 719/310, 719/328; 713/300, 502; 707/705
See application file for complete search history.

(56) References Cited

U.S. PATENT DOCUMENTS

| | | | | |
|---|---|---|---|---|
| 4,591,980 | A | 5/1986 | Huberman et al. | 712/16 |
| 5,220,674 | A | 6/1993 | Morgan et al. | |
| 5,325,525 | A | 6/1994 | Shan et al. | 718/104 |
| 5,559,978 | A | 9/1996 | Spilo | 711/203 |
| 5,630,156 | A | 5/1997 | Privat et al. | 712/14 |
| 5,640,569 | A | 6/1997 | Miller et al. | |
| 5,729,472 | A | 3/1998 | Seiffert et al. | |
| 5,884,046 | A | 3/1999 | Antonov | |

(Continued)

FOREIGN PATENT DOCUMENTS

EP    0790559 A    8/1997

(Continued)

OTHER PUBLICATIONS

Al-Theneyan, Ahmed Hamdan, "A Policy-Based Resource Brokering Environment for Computational Grids" (2002) PHD Dissertation, Old Dominion University, United States—Virginia.

(Continued)

*Primary Examiner*—Lechi Truong
(74) *Attorney, Agent, or Firm*—William H. Steinberg; Amy J. Pattillo

(57) ABSTRACT

An efficiency-based workload manager samples multiple actual resource use characteristics while a process executes, where the actual resource use characteristics designate a portion of a total amount of system resources available to the process that are utilized by the process at multiple times over a sampling period. Next, responsive to detecting the conclusion of the sampling period, the efficiency-based workload manager determines an operation based resource utilization threshold for the process based on a maximum resource use within the multiple samplings of actual resource use characteristics. Then, the efficiency-based workload manager stores the operation based resource utilization threshold for access by a workload manager, where the workload manager uses the operation based resource utilization threshold to restrict the process to resource use up to the operation based resource utilization threshold within an execution environment managed by the workload manager.

16 Claims, 5 Drawing Sheets

U.S. PATENT DOCUMENTS

| | | | |
|---|---|---|---|
| 5,905,975 | A | 5/1999 | Ausubel |
| 5,931,911 | A | 8/1999 | Remy et al. ................. 709/223 |
| 5,978,583 | A | 11/1999 | Ekanadham et al. ........ 717/106 |
| 6,003,075 | A | 12/1999 | Arendt et al. |
| 6,021,398 | A | 2/2000 | Ausubel |
| 6,023,612 | A * | 2/2000 | Harris et al. ............. 455/127.1 |
| 6,049,828 | A | 4/2000 | Dev et al. |
| 6,067,580 | A | 5/2000 | Aman ......................... 719/33 |
| 6,119,186 | A | 9/2000 | Watts et al. |
| 6,154,787 | A | 11/2000 | Urevig et al. |
| 6,167,445 | A | 12/2000 | Gai et al. |
| 6,310,889 | B1 | 10/2001 | Parsons et al. |
| 6,356,909 | B1 | 3/2002 | Spencer ....................... 707/10 |
| 6,418,462 | B1 | 7/2002 | Xu .............................. 709/201 |
| 6,430,711 | B1 | 8/2002 | Sekizawa |
| 6,438,704 | B1 | 8/2002 | Harris et al. ................ 713/502 |
| 6,452,692 | B1 | 9/2002 | Yacoub |
| 6,453,376 | B1 | 9/2002 | Fairman et al. ............. 710/240 |
| 6,463,454 | B1 | 10/2002 | Lumelsky et al. |
| 6,470,384 | B1 | 10/2002 | O'Brien et al. |
| 6,480,955 | B1 | 11/2002 | DeKoning et al. |
| 6,552,813 | B2 | 4/2003 | Yacoub |
| 6,560,609 | B1 | 5/2003 | Frey et al. |
| 6,578,160 | B1 | 6/2003 | MacHardy et al. |
| 6,606,602 | B1 | 8/2003 | Kolls |
| 6,625,643 | B1 | 9/2003 | Colby et al. |
| 6,647,373 | B1 | 11/2003 | Carlton-Foss |
| 6,654,759 | B1 | 11/2003 | Brunet et al. |
| 6,654,807 | B2 | 11/2003 | Farber et al. |
| 6,671,676 | B1 | 12/2003 | Shacham ...................... 705/37 |
| 6,681,251 | B1 | 1/2004 | Leymann et al. ............ 709/226 |
| 6,701,342 | B1 | 3/2004 | Bartz et al. |
| 6,714,987 | B1 | 3/2004 | Amin et al. |
| 6,717,694 | B1 | 4/2004 | Fukunaga et al. |
| 6,748,416 | B2 | 6/2004 | Carpenter et al. ........... 709/202 |
| 6,816,905 | B1 | 11/2004 | Sheets et al. |
| 6,941,865 | B2 | 9/2005 | Kato |
| 6,954,739 | B1 | 10/2005 | Boillet et al. |
| 6,963,285 | B2 | 11/2005 | Fischer et al. |
| 7,050,184 | B1 | 5/2006 | Miyamoto |
| 7,055,052 | B2 | 5/2006 | Chalasani et al. |
| 7,080,077 | B2 | 7/2006 | Ramamurthy et al. |
| 7,093,259 | B2 | 8/2006 | Pulsipher et al. |
| 7,096,248 | B2 | 8/2006 | Masters et al. |
| 7,123,375 | B2 | 10/2006 | Nobutani et al. |
| 7,124,062 | B2 | 10/2006 | Gebhart |
| 7,171,654 | B2 | 1/2007 | Werme et al. |
| 7,181,302 | B2 | 2/2007 | Bayne et al. |
| 7,181,743 | B2 | 2/2007 | Werme et al. |
| 7,243,121 | B2 | 7/2007 | Neiman et al. |
| 7,243,147 | B2 | 7/2007 | Hodges et al. |
| 7,245,584 | B2 | 7/2007 | Goringe et al. |
| 7,272,732 | B2 * | 9/2007 | Farkas et al. ................ 713/320 |
| 7,283,935 | B1 | 10/2007 | Pritchard et al. |
| 7,293,092 | B2 | 11/2007 | Sukegawa |
| 7,340,654 | B2 | 3/2008 | Bigagli et al. |
| 7,426,267 | B1 | 9/2008 | Caseau |
| 7,433,931 | B2 | 10/2008 | Richoux |
| 7,437,675 | B2 | 10/2008 | Casati et al. |
| 7,451,106 | B1 | 11/2008 | Gindlesperger |
| 7,472,112 | B2 | 12/2008 | Pfeiger et al. |
| 7,533,168 | B1 | 5/2009 | Pabla et al. |
| 7,552,437 | B2 | 6/2009 | Di Luoffo et al. |
| 7,562,143 | B2 | 7/2009 | Fellenstein et al. |
| 7,584,274 | B2 | 9/2009 | Bond et al. |
| 2002/0023168 | A1 | 2/2002 | Bass et al. |
| 2002/0057684 | A1 | 5/2002 | Miyamoto et al. .......... 370/386 |
| 2002/0072974 | A1 | 6/2002 | Pugliese et al. |
| 2002/0103904 | A1 | 8/2002 | Hay ........................... 709/225 |
| 2002/0116488 | A1 | 8/2002 | Subramanian et al. |
| 2002/0152305 | A1 | 10/2002 | Jackson et al. |
| 2002/0171864 | A1 | 11/2002 | Sesek |
| 2002/0188486 | A1 | 12/2002 | Gil et al. |
| 2003/0011809 | A1 | 1/2003 | Suzuki et al. |
| 2003/0036886 | A1 | 2/2003 | Stone |
| 2003/0041010 | A1 | 2/2003 | Yonao-Cowan |
| 2003/0058797 | A1 | 3/2003 | Izmailov et al. |
| 2003/0088671 | A1 | 5/2003 | Klinker et al. |
| 2003/0101263 | A1 | 5/2003 | Bouillet et al. |
| 2003/0108018 | A1 | 6/2003 | Dujardin et al. |
| 2003/0112809 | A1 | 6/2003 | Bharali et al. ............... 370/400 |
| 2003/0115099 | A1 | 6/2003 | Burns et al. .................... 705/14 |
| 2003/0126240 | A1 | 7/2003 | Vosseler |
| 2003/0126265 | A1 | 7/2003 | Aziz et al. |
| 2003/0140143 | A1 | 7/2003 | Wolf et al. |
| 2003/0145084 | A1 | 7/2003 | McNerney ................... 709/224 |
| 2003/0161309 | A1 | 8/2003 | Karuppiah |
| 2003/0195813 | A1 | 10/2003 | Pallister et al. |
| 2003/0204485 | A1 | 10/2003 | Triggs ........................... 707/1 |
| 2003/0204758 | A1 | 10/2003 | Singh |
| 2003/0212782 | A1 | 11/2003 | Canali et al. |
| 2004/0019624 | A1 | 1/2004 | Sukegawa ................... 709/201 |
| 2004/0064548 | A1 | 4/2004 | Adams et al. |
| 2004/0078471 | A1 | 4/2004 | Yang .......................... 709/227 |
| 2004/0095237 | A1 | 5/2004 | Chet et al. |
| 2004/0098606 | A1 | 5/2004 | Tan et al. |
| 2004/0103339 | A1 | 5/2004 | Chalasani et al. |
| 2004/0120256 | A1 | 6/2004 | Park ........................... 370/235 |
| 2004/0145775 | A1 | 7/2004 | Kubler et al. |
| 2004/0213220 | A1 | 10/2004 | Davis |
| 2004/0215590 | A1 | 10/2004 | Kroening |
| 2004/0225711 | A1 | 11/2004 | Burnett et al. |
| 2005/0021349 | A1 | 1/2005 | Chiliotis et al. |
| 2005/0021742 | A1 | 1/2005 | Yemini et al. |
| 2005/0027691 | A1 | 2/2005 | Brin et al. |
| 2005/0027865 | A1 | 2/2005 | Bozak et al. |
| 2005/0044228 | A1 | 2/2005 | Birkestrand et al. |
| 2005/0065994 | A1 * | 3/2005 | Creamer et al. ............. 709/202 |
| 2005/0108394 | A1 | 5/2005 | Braun et al. |
| 2005/0120160 | A1 | 6/2005 | Plouffe et al. |
| 2005/0132041 | A1 | 6/2005 | Kundu |
| 2005/0138162 | A1 * | 6/2005 | Byrnes ....................... 709/223 |
| 2005/0138175 | A1 | 6/2005 | Kumar et al. |
| 2005/0182838 | A1 | 8/2005 | Sheets et al. |
| 2005/0187797 | A1 | 8/2005 | Johnson |
| 2005/0187977 | A1 | 8/2005 | Frost |
| 2005/0257079 | A1 | 11/2005 | Arcangeli |
| 2005/0283788 | A1 | 12/2005 | Bigagli et al. |
| 2006/0064698 | A1 | 3/2006 | Miller et al. |
| 2006/0069621 | A1 | 3/2006 | Chang et al. |
| 2006/0075041 | A1 | 4/2006 | Antonoff et al. |
| 2006/0075042 | A1 | 4/2006 | Wang et al. |
| 2006/0288251 | A1 | 12/2006 | Jackson |
| 2006/0294218 | A1 | 12/2006 | Tanaka et al. |

FOREIGN PATENT DOCUMENTS

| | | | |
|---|---|---|---|
| EP | 1267552 A | 12/2002 | |

OTHER PUBLICATIONS

Leff, Avraham, "Service Level Agreements and Commercial Grids", IEEE Internet Computing (Jul.-Aug. 2003): pp. 44-50.

Hill, J.R. "A Management Platform for Commercial Web Services." BT Technology Journal (Jan. 2004): vol. 22, No. 1, pp. 52-62).

Alexander Keller and Heiko Ludwig, "The WSLA Framework: Specifying and Monitoring Service Level Agreements for Web Services." Journal of Network and Systems Management, vol. 11, No. 1, Mar. 2003, pp. 57-81.

Menasce, Daniel A, "QOS in Grid Computing", IEEE Internet Computing (Jul.-Aug. 2004), pp. 85-87.

T Boden, "The Grid Enterprise—Structuring the Agile Business of the Future." BT Technology Journal, vol. 22, No. 1, Jan. 2004, pp. 107-117.

USPTO Office Action, U.S. Appl. No. 11/031,403, Mailing Date Oct. 24, 2008, 19 pages.

Massie ML et al, "The Ganglia Distributed Monitoring System: Design, Implementation, and Experience" Parallel Computing Elsevier Netherlands, vol. 30, No. 7, Jul. 2004, pp. 817-840.

Fenglian Xu et al, "Tools and Support for Deploying Applications on the Grid" Services Computing, 2004. Proceedings 2004 International Conference on Shanghai, China, Sep. 15-18, 2004, Piscataway, NJ, IEEE, pp. 281-287.

Ian Foster and Carl Kesselman, "Grid2—Blueprint for a New Computing Infrastructure" 2004, Elsevier, San Francisco, CA, chapter 20, Instrumentation and Monitoring, pp. 319-343.

Smallen S et al, "The Inca Test Harness and Reporting Framework" Supercomputing 2004. Proceedings of the ACM/IEEE SC2004 Conference Pittsburgh, PA, Nov. 2004, p. 1-10.

Allen G, et al, "The Cactus Worm: Experiments with Dynamic Resource Discovery and Allocation in a Grid Environment", International Journal of High Performance Computing Applications, Sage Science Press, Thousand Oaks, US, vol. 15, No. 4, 2001, pp. 345-358.

Hwa Min Lee, "A Fault Tolerance Service for QoS in Grid Computing", Lecture Notes in Computer Science, vol. 2659, Aug. 2003, pp. 286-296.

Tianyi Zang, et al, "The Design and Implementation of an OGSA-based grid information service" Web Services, 2004. Proceedings IEEE International Conference on San Diego CA, Piscataway, NJ, IEEE, Jul. 6, 2004, pp. 566-573.

Sample N, et al, "Scheduling Under Uncertainty: Planning for the Ubiquitous Grid", Coordination Models and Languages, 5th International Conference, Coordination 2002. Proceedings (Lecture Notes in Computer Science, vol. 2315) Springer-Varlag Berlin, Germany, 2002, pp. 300-316.

Gever DH, et al, "WWW-based high performance computing support of acoustic matched field processing", MTS/IEEE Oceans 2001. An Ocean Odessey. Conference Proceedings (IEEE Cat. No. 01CH37295) Marine Technology Soc. Washington, DC, vol. 4, 2001, pp. 2541-2548.

Chase, JS et al, "Dynamic Virtual Clusters in a Grid Site Manager", High Performance Distributed Computing 2003. Proceedings. 12th IEEE International Symposium, Jun. 22-24, 2003, Piscataway, NJ, USA, IEEE, pp. 90-100.

"Method of Providing On-Demand-Computing for Server Blades", IP.com Journal, IP.com Inc., West Henrietta, NY, US, Sep. 8, 2003, p. 1.

Kubicek, C, et al., "Dynamic Allocation of Servers to Jobs in a Grid Hosting Environment", BY Technology Journal, vol. 22, No. 3, Jul. 2004, pp. 251-260.

Yang, Kun, et al, "Network Engineering Towards Efficient Resource On-Demand in Grid Computing", Communication Technology Proceedings, 2003, ICCT 2003, International Conference on Apr. 9-11, 2003, Piscataway, NJ, USA, IEEE, vol. 2, Apr. 9, 2003, pp. 1715-1718.

U.S. Appl. No. 11/031,490, filed Jan. 6, 2005, Fellenstein et al.
U.S. Appl. No. 11/031,541, filed Jan. 6, 2005, Fellenstein et al.
U.S. Appl. No. 11/031,542, filed Jan. 6, 2005, Dawson et al.
U.S. Appl. No. 11/031,543, filed Jan. 6, 2005, Fellenstein et al.
U.S. Appl. No. 11/031,489, filed Jan. 6, 2005, Fellenstein et al.
U.S. Appl. No. 11/031,403, filed Jan. 6, 2005, Ernest et al.
U.S. Appl. No. 11/031,427, filed Jan. 6, 2005, Fellenstein et al.

Rolia, Jerry et al, "Service Centric Computing—Next Generation Internet Computing", 2002, Springer-Verlag Berlin Heidelberg, pp. 463-479.

Belloum, Adam et al, "VLAM-G: a grid-based virtual laboratory", 2002, Future Generation Computer Systems 19, Elsevier Science B.V., pp. 209-217.

Min, D. and Mutka, M., "Efficient Job Scheduling in a Mesh Multicomputer Without Discrimination Against Large Jobs", 1995, IEEE., pp. 52-59.

Ding et al., "An Agent Model for Managing Distributed Software Resources in Grid Environment", 2003, ICCS, LNCS 2658, pp. 971-980.

Cao et al, GridFlow: Workflow management for grid computing, C&C Res. Labs, NEC Eur Ltd, Germany: This paper appears in : Cluster Computing and Grid, 2003. Proceedings. CCGrid 2003. 3rd IEEE/ACL International Symposium; Publication date: May 12-15, 2003, 8 pages.

"The DataGrid Workload Management System: Challenges and Results", Journal of Grid Computing, Springer Netherlands, ISSN 1570-7873 (Print) 1572-9814 (Online), vol. 2, No. 4, Dec. 2004, pp. 353-367.

USPTO Office Action Response in pending U.S. Appl. No. 11/031,490, filed Jan. 6, 2005, Craig William Fellenstein et al, Mailing date: May 29, 2009, 10 pages.

Office Action, U.S. Appl. No. 11/767,502, filed Jun. 23, 2007, Zhendong Bao, Mailed Jun. 25, 2009, pp. 1-14.

Weng et al, "A cost-based online scheduling algorithm for job assignment on computational grids", Springer-Verlag Berlin Heidelberg, 2003, pp. 343-351.

Andrade et al, "Our grid: An approach to easily assemble grids with equitable resource sharing", Springer-Verlag Berlin Heidelberg, 2003, pp. 61-86.

Chase, JS et al, "Dynamic Virtual Clusters in a Grid Site Manager," High Performance Distributed Computing 2003. Proceedings, 12th IEEE International Symposium, Jun. 22-24, 2003, Piscataway, NJ USA, IEEE, pp. 90-100.

Office Action, U.S. Appl. No. 10/940,452, filed Sep. 14, 2004, Craig Fellenstein, Mailed Jun. 23, 2009, pp. 1-13.

Office Action, U.S. Appl. No. 12/211,243, filed Sep. 16, 2008, Di Luoffo et al, Mailed Aug. 12, 2009, pp. 1-18.

Office Action, U.S. Appl. No. 11/031,542, filed Jan. 6, 2005, Dawson et al, Mailed Jul. 7, 2009, pp. 1-15.

Moore et al, "Managing Mixed Use Clusters with Cluster on Demand", Duke University, Nov. 2002.

In re Vincent Valentino Di Luoffo, Notice of Allowance, U.S. Appl. No. 12/211,243, filed Sep. 16, 2003, mail date Dec. 31, 2009, 18 pages.

In re Fellenstein, Final Office Action, U.S. Appl. No. 11/031,490, filed Jan. 6, 2005, mail date Dec. 28, 2009, 21 pages.

In re Fellenstein, Notice of Allowance, U.S. Appl. No. 12/364,469, filed Feb. 2, 2009, mail date Jan. 5, 2010, 27 pages.

In re Fellenstein, Supplemental Notice of Allowance, U.S. Appl. No. 12/364,469, filed Feb. 2, 2009, mail date Jan. 19, 2010, 7 pages.

In re Fellenstein, Notice of Allowance, U.S. Appl. No. 11/031,542, filed Jan. 6, 2005, mail date Dec. 8, 2009, 35 pages.

In re Fellenstein, Notice of Allowance, U.S. Appl. No. 10/940,452, filed Sep. 14, 2004, mail date Dec. 16, 2009, 28 pages.

Foster et al.; The Anatomy of the Grid, Enabling Scalable Virtual Organizations; available at .globus.org/research/papers/anatomy.pdf as of Nov. 27, 2003.

Foster et al.; The Physiology of the Grid, An Open Grid Services Architecture for Distributed Systems Integration; available at .globus/org/research/papers/ogsa.pdf as of Nov. 27, 2003.

Foster, Ian; What is the Grid? A Three Point Checklist; available at fp.mcs.anl.gov/~foster/Articles/WhatIsTheGrid.pdf as of Nov. 27, 2003.

Ferreira et al.; IBM Redpaper—Globus Toolkit 3.0 Quick Start; available at .redbooks.ibm.com/redpapers/pdfs/redp369 as of Nov. 27, 2003.

IBM Grid Computing—What is Grid Computing; available at 1.ibm.com/grid/about_grid/what_is.shtml as of Nov. 27, 2003.

Berstis, Viktors; IBM Redpaper—Fundamentals of Grid Computing; available at .redbooks.ibm.com/redpapers/pdfs/redp3613.pdf as of Nov. 27, 2003.

Jacob, Bart; IBM Grid Computing—Grid Computing: What are the key components?; available at -106.ibm.com/developerworks/grid/library/gr-overview/ as of Nov. 27, 2003.

Unger et al.; IBM Grid Computing—A Visual Tour of Open Grid Services Architecture; available at -106.ibm.com/developerworks/grid/library/gr-visual/ as of Nov. 27, 2003.

Edited by Rajkumar Buyya; Grid Computing Info Centre: Frequently Asked Questions (FAQ); available at .cs.mu.oz.au/~raj/GridInfoware/gridfaq.html as of Nov. 27, 2003.

Office Action, U.S. Appl. No. 11/031,426, filed Jan. 6, 2005, Carl Philip Gusler et al., Mailed Nov. 13, 2009, 21 pages.

Notice of Allowance, U.S. Appl. No. 11/031,403, filed Jan. 6, 2005, Leslie Mark Ernest et al., Mailed Oct. 5, 2009, 15 pages.

In re Fellenstein, Notice of Allowance, U.S. Appl. No. 12/125,879, filed May 22, 2008, mail date Jan. 29, 2010, 24 pages.

In re Fellenstein, Notice of Allowance, U.S. Appl. No. 11/031,490, filed Jan. 6, 2005, mail date Mar. 9, 2010, 12 pages.

In re Fellenstein, Notice of Allowance, U.S. Appl. No. 12/359,216, filed Jan. 23, 2009, mail date Feb. 1, 2010, 25 pages.

In re Fellenstein, Office Action, U.S. Appl. No. 12/491,172, filed Jun. 24, 2009, mail date Apr. 6, 2010, 30 pages.

In re Fellenstein, Office Action, U.S. Appl. No. 12/196,287, filed Aug. 22, 2008, mail date Mar. 30, 2010, 24 pages.

In re Fellenstein, Office Action, U.S. Appl. No. 11/031,489, filed Jan. 6, 2005, mail date Apr. 5, 2010, 28 pages.

TTI Cluster Computing Services On Demand, ClusterOnDemand.com publicly available and archived by Arhive.org on or before Dec. 8, 2004, 4 pages.

"IBM Girds for Grids". McConnell, Chris. Enterprise System Journal, Oct. 2001, 1 page.

"Grid Computing set for big growth". Tanner, John, America's Network, vol. 107, No. 8, May 15, 2003, 6 pages.

Office Action, U.S. Appl. No. 12/125,892, filed May 22, 2008, mailed Aug. 26, 2009.

Office Action, U.S. Appl. No. 12/125,879, filed May 22, 2008, mailed Sep. 15, 2009.

Notice of Allowance, U.S. Appl. No. 12/194,989, filed Aug. 20, 2008, mailed Sep. 30, 2009.

In re Fellenstein, Notice of Allowance, U.S. Appl. No. 12/364,469, filed Feb. 2, 2009, mail date Apr. 4, 2010, 16 pages.

* cited by examiner

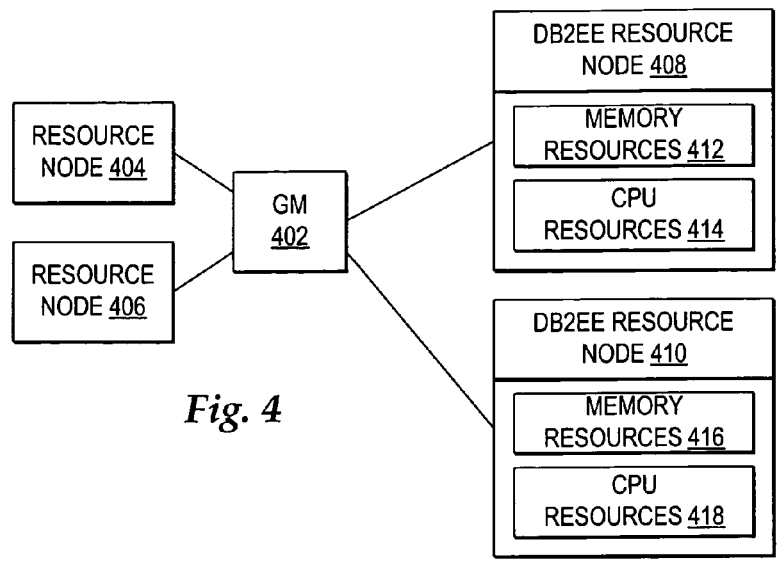
*Fig. 4*
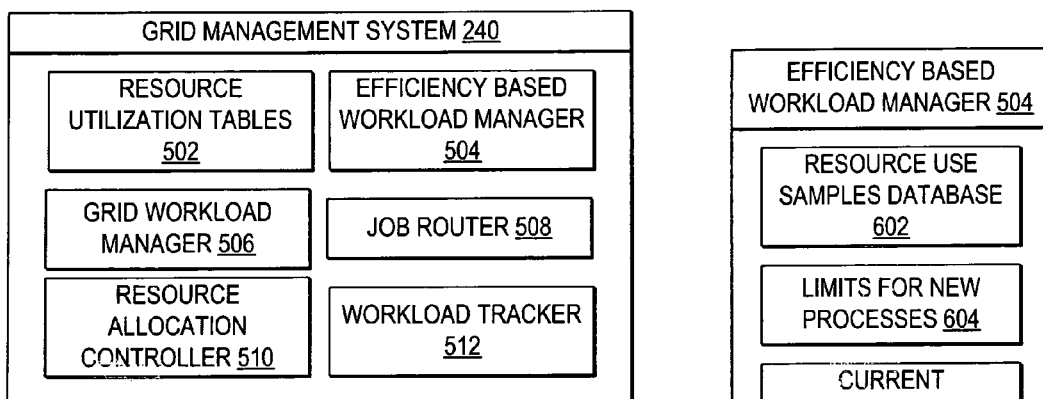
*Fig. 5*
*Fig. 6*
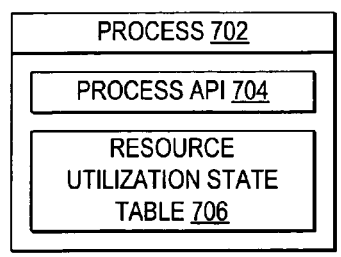
*Fig. 7*

SETTING OPERATION BASED RESOURCE UTILIZATION THRESHOLDS FOR RESOURCE USE BY A PROCESS

CROSS-REFERENCE TO RELATED APPLICATIONS

The present application is related to the following co-pending application:

(1) U.S. patent application Ser. No. 11/031,490, filed Jan. 6, 2005, with Rick Allen Hamilton II and James W. Seaman as common inventors.

BACKGROUND OF THE INVENTION

1. Technical Field

The present invention relates in general to improved computer system resource optimization and, in particular, to setting operation based resource utilization thresholds for resource use by a process. Still more particularly, the present invention relates to learning actual resource use by a process over a sampling period, determining an operation based resource utilization threshold for resource use by the process, and storing the operation based resource utilization threshold for access by workload managers controlling ongoing resource use by the process.

2. Description of the Related Art

Most software applications and executable processes require system resources, such as memory and processors, for execution within a computer system or server system environment. In addition, most processes will utilize all the available system resources unless restricted to use of a threshold amount of systems resources. Software applications, in particular, are typically designed to work on any hardware platform with a minimum amount of system resources available, so that once the minimum system resource requirements are met, the software application is not restrained on use of as much of the remaining system resources.

Responsive to processes that grab all the available system resources, many software-based system resource optimization tools have developed in an attempt to optimize the memory available. For example, one software-based memory management tool attempts to optimize memory availability and use by compressing unused portions of memory, which are generally filled with zeros, to provide the illusion that there is more memory available than the actual physical memory installed and enable an operating system to manage multiple running applications at one time. Compressing memory, however, is limited because if no additional memory exists, then an application requesting additional memory is still memory constrained. Another software-based memory management tool attempts to defragment memory to free up additional memory spaces by moving all the memory used by an application to a contiguous block. Defragmentation software, however, is also limited because defragmentation reduces application performance as content is moved around and even after defragmentation, there may not be sufficient contiguous memory to meet the memory requirements of an additional application. Further, both memory compression and memory defragmentation are memory optimization solutions that react to the memory use by processes, such that memory grabbing by applications is only limited by the amount of memory available after compression or fragmentation.

Within a server system or other network based execution environment, the problem of applications grabbing as many system resources as possible is amplified because the total amount of available resources is typically expanded to handle multiple simultaneously running processes. Thus, server systems and other network based execution environments may implement a software-based workload manager, such as IBM's Workload Manager, that caps utilization of resources by each process to a threshold limit. In particular, rather than attempt to manage efficiency of resource use by a process, the workload manager just monitors memory and CPU use by a process and places a cap on use if the process meets or exceeds memory and CPU limits. A limitation of workload managers and other resource use restriction managers is that these managers set the same standardized resource utilization thresholds to all processes, regardless of the actual operational resource use by processes. This limitation of applying standardized resource utilization thresholds is particularly disadvantageous in a grid environment or other distributed resource environment where heterogeneous resources are managed by different workload managers, but grouped to form an execution environment for a particular job, and thus the actual resources available for execution of a process are distributed among multiple workload and optimization managers.

Therefore, in view of the foregoing, there is a need for a method, system, and program for learning the actual resource use of the total amount of system resources available by a process, determining a operation based threshold of resource use for the process, and teaching the process the operation based threshold, so that workload managers apply operation based, process specific thresholds when capping resource use by a process.

SUMMARY OF THE INVENTION

In view of the foregoing, the present invention in general provides for improved computer system resource optimization and in particular to setting operation based resource utilization thresholds for resource use by a process. Still more particularly, the present invention relates to learning actual resource use by a process over a sampling period, determining an operation based resource utilization threshold for resource use by the process, and storing the operation based resource utilization threshold for access by workload managers controlling ongoing resource use by the process.

According to one embodiment, an efficiency-based workload manager samples multiple actual resource use characteristics while a process executes, where the actual resource use characteristics designate a portion of a total amount of system resources available to the process that are utilized by the process at multiple times over a sampling period. Next, responsive to detecting the conclusion of the sampling period, the efficiency-based workload manager determines an operation based resource utilization threshold for the process based on a maximum resource use within the multiple samplings of actual resource use characteristics. Then, the efficiency-based workload manager stores the operation based resource utilization threshold for access by a workload manager, where the workload manager uses the operation based resource utilization threshold to restrict the process to resource use up to the operation based resource utilization threshold within an execution environment managed by the workload manager.

The efficiency-based workload manager also detects the total amount of system resources available to the process and calculates a standard limit based resource utilization threshold based on a standard limit applied to the total amount of system resources available to the process. Then, during the sampling period, the efficiency-based workload manager restricts the process to use of the total amount of system resource capped by the standard limit based resource utilization threshold.

When the efficiency-based workload manager stores the operation based resource utilization threshold, in one embodiment, the efficiency-based workload manager calls an application programming interface (API) for the process to request storage of the efficiency-based workload manager in a file accessible to the workload manager by calling the API with a request to access the operation based resource threshold. In another embodiment, the efficiency-based workload manager stores the operation based resource threshold for a process in a table accessible across a network of server systems to multiple workload managers, including workload managers operating as grid services and workload managers operating at a hardware platform level.

BRIEF DESCRIPTION OF THE DRAWINGS

The novel features believed aspect of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 4 is a block diagram depicting instances of a grid manager managing multiple resource nodes within a grid environment in accordance with the method, system, and program of the present invention;

FIG. 5 is a block diagram depicting a grid management system for managing a grid environment in accordance with the method, system, and program of the present invention;

FIG. 6 is a block diagram depicting a block diagram of the components of an efficiency based workload manager (EB-WLM) for learning resource use by a process and teaching the process thresholds for actual operation based use that are then available for regulating resource use by the process;

FIG. 7 is a block diagram depicting a process with a resource utilization state table that designates the thresholds for resource use by the process in accordance with the method, system, and program of the present invention.

DETAILED DESCRIPTION OF THE PREFERRED EMBODIMENT

Figure 1:
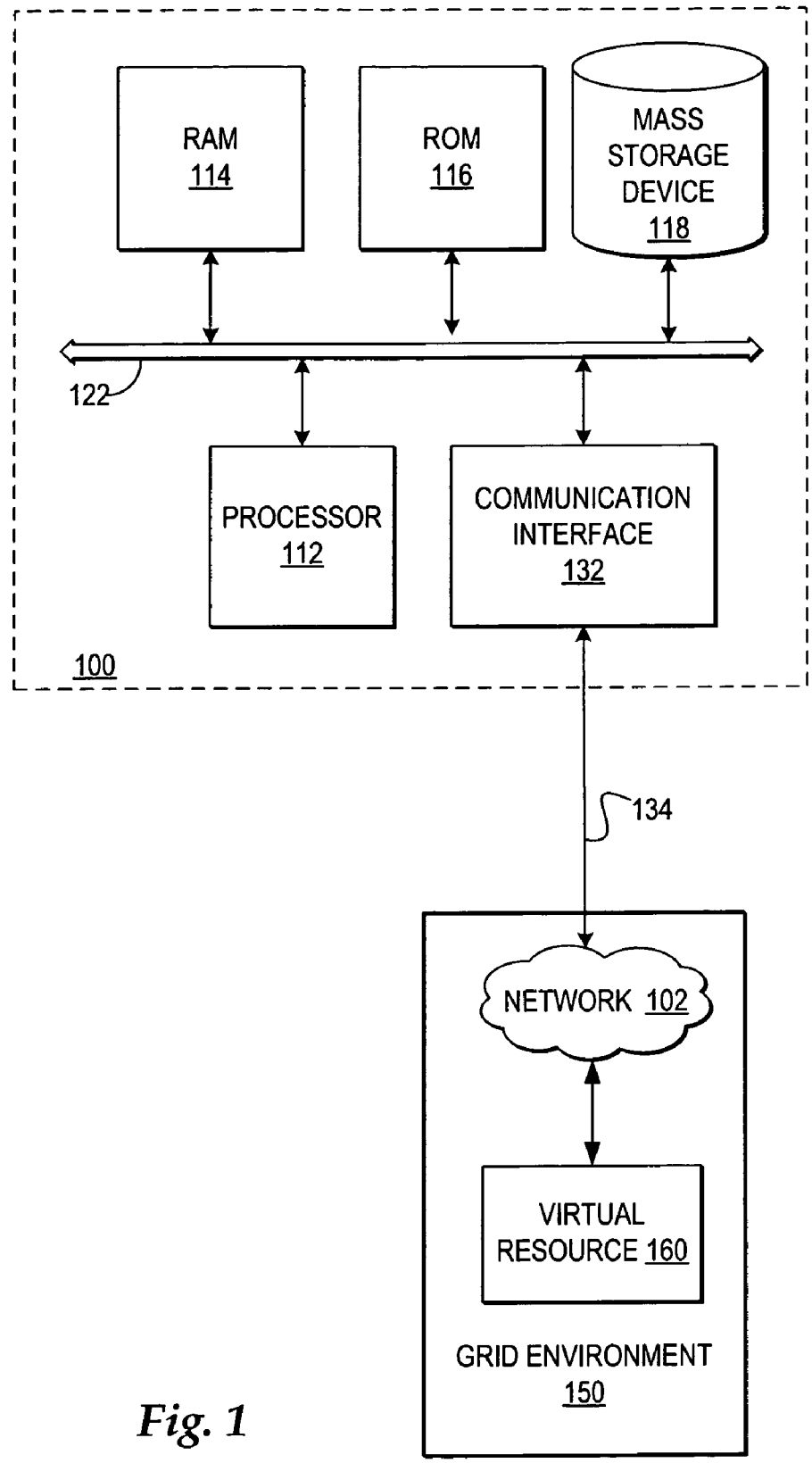
FIG. 1 depicts one embodiment of a computer system which may be implemented in a grid environment and in which the present invention may be implemented.

Referring now to the drawings and in particular to FIG. 1, there is depicted one embodiment of a computer system which may be implemented in a grid environment and in which the present invention may be implemented. As will be further described, the grid environment includes multiple computer systems managed to provide resources. Additionally, as will be further described, the present invention may be executed in a variety of computer systems, including a variety of computing systems, mobile systems, and electronic devices operating under a number of different operating systems managed within a grid environment.

In one embodiment, computer system 100 includes a bus 122 or other device for communicating information within computer system 100, and at least one processing device such as processor 112, coupled to bus 122 for processing information. Bus 122 may include low-latency and higher latency paths connected by bridges and adapters and controlled within computer system 100 by multiple bus controllers. When implemented as a server system, computer system 100 typically includes multiple processors designed to improve network servicing power.

Processor 112 may be a general-purpose processor such as IBM's PowerPC™ processor that, during normal operation, processes data under the control of operating system and application software accessible from a dynamic storage device such as random access memory (RAM) 114 and a static storage device such as Read Only Memory (ROM) 116. The operating system may provide a graphical user interface (GUI) to the user. In one embodiment, application software contains machine executable instructions that when executed on processor 112 carry out the operations depicted in the flowcharts of FIGS. 8A-8B and other operations described herein. Alternatively, the steps of the present invention might be performed by specific hardware components that contain hardwired logic for performing the steps, or by any combination of programmed computer components and custom hardware components.

The present invention may be provided as a computer program product, included on a machine-readable medium having stored thereon the machine executable instructions used to program computer system 100 to perform a process according to the present invention. The term "machine-readable medium" as used herein includes any medium that participates in providing instructions to processor 112 or other components of computer system 100 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 100 can read and which is suitable for storing instructions. In the present embodiment, an example of a non-volatile medium is mass storage device 118 which as depicted is an internal component of computer system 100, but will be understood to also be provided by an external device. Volatile media include dynamic memory such as RAM 114. Transmission media include coaxial cables, copper wire or fiber optics, including the wires that comprise bus 122. Transmission media can also take the form of acoustic or light waves, such as those generated during radio frequency or infrared data communications.

Moreover, the present invention may be downloaded as a computer program product, wherein the program instructions may be transferred from a remote virtual resource, such as a virtual resource 160, to requesting computer system 100 by way of data signals embodied in a carrier wave or other propagation medium via a network link 134 (e.g. a modem or network connection) to a communications interface 132 coupled to bus 122. Virtual resource 160 may include a virtual representation of the resources accessible from a single system or systems, wherein multiple systems may each be considered discrete sets of resources operating on independent platforms, but coordinated as a virtual resource by a grid manager. Communications interface 132 provides a two-way data communications coupling to network link 134 that may be connected, for example, to a local area network (LAN), wide area network (WAN), or an Internet Service Provider (ISP) that provide access to network 102. In particular, network link 134 may provide wired and/or wireless network communications to one or more networks, such as network 102, through which use of virtual resources, such as virtual resource 160, is accessible as provided within a grid environment 150. Grid environment 150 may be part of multiple types of networks, including a peer-to-peer network, or may be part of a single computer system, such as computer system 100.

As one example, network 102 may refer to the worldwide collection of networks and gateways that use a particular protocol, such as Transmission Control Protocol (TCP) and Internet Protocol (IP), to communicate with one another. Network 102 uses electrical, electromagnetic, or optical signals that carry digital data streams. The signals through the various networks and the signals on network link 134 and through communication interface 132, which carry the digital data to and from computer system 100, are exemplary forms of carrier waves transporting the information. It will be understood that alternate types of networks, combinations of networks, and infrastructures of networks may be implemented.

When implemented as a server system, computer system 100 typically includes multiple communication interfaces accessible via multiple peripheral component interconnect (PCI) bus bridges connected to an input/output controller. In this manner, computer system 100 allows connections to multiple network computers.

Additionally, although not depicted, multiple peripheral components and internal/external devices may be added to computer system 100, connected to multiple controllers, adapters, and expansion slots coupled to one of the multiple levels of bus 122. For example, a display device, audio device, keyboard, or cursor control device may be added as a peripheral component.

Those of ordinary skill in the art will appreciate that the hardware depicted in FIG. 1 may vary. Furthermore, those of ordinary skill in the art will appreciate that the depicted example is not meant to imply architectural limitations with respect to the present invention.

Figure 2:
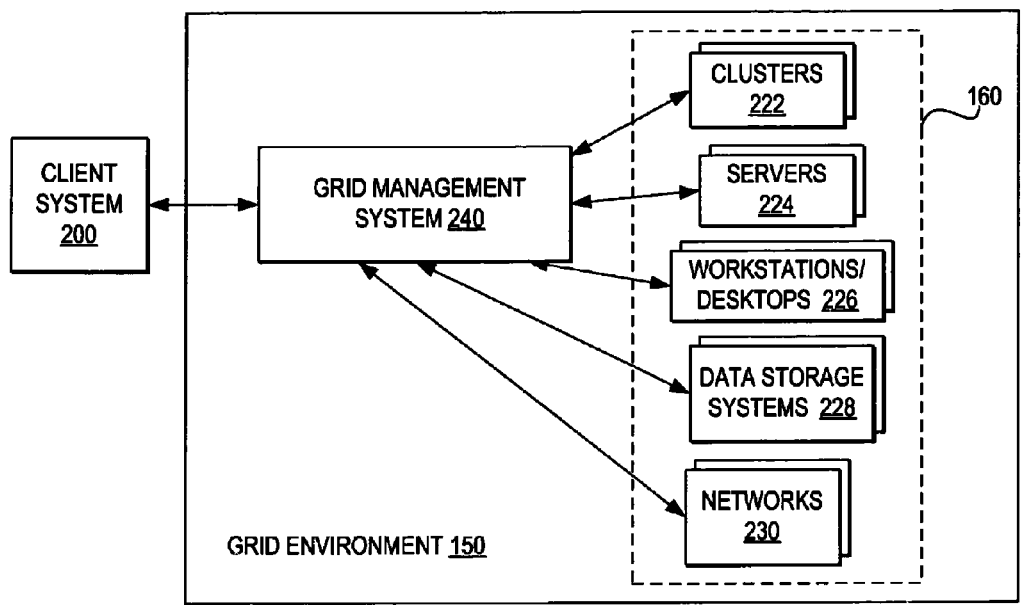
FIG. 2 is block diagram illustrating one embodiment of the general types of components within a grid environment.

With reference now to FIG. 2, a block diagram illustrates one embodiment of the general types of components within a grid environment. In the present example, the components of a grid environment 150 include a client system 200 interfacing with a grid management system 240 which interfaces with server clusters 222, servers 224, workstations and desktops 226, data storage systems 228, and networks 230. For purposes of illustration, the network locations and types of networks connecting the components within grid environment 150 are not depicted. It will be understood, however, that the components within grid environment 150 may reside atop a network infrastructure architecture that may be implemented with multiple types of networks overlapping one another. Network infrastructure may range from multiple large enterprise systems to a peer-to-peer system to a single computer system. Further, it will be understood that the components within grid environment 150 are merely representations of the types of components within a grid environment. A grid environment may simply be encompassed in a single computer system or may encompass multiple enterprises of systems. In addition, it will be understood that a grid vendor may provide grid environment 150, where the grid vendor may calculate a cost for use of resources within grid environment 150 based on the amount of time required for a grid job to execute or the actual amount of resources used, for example.

The central goal of a grid environment, such as grid environment 150 is organization and delivery of resources from multiple discrete systems viewed as virtual resource 160. Client system 200, server clusters 222, servers 224, workstations and desktops 226, data storage systems 228, networks 230 and the systems creating grid management system 240 may be heterogeneous and regionally distributed with independent management systems, but enabled to exchange information, resources, and services through a grid infrastructure enabled by grid management system 240. Further, server clusters 222, servers 224, workstations and desktops 226, data storage systems 228, and networks 230 may be geographically distributed across countries and continents or locally accessible to one another. It will be understood that mechanisms for discovery of grid resources within virtual resource 160 are not depicted herein, however, client system 200 may discover the resources within virtual resource 160 as advertised from local and global directories available within grid environment 150.

In the example, client system 200 interfaces with grid management system 240. Client system 200 may represent any computing system sending requests to grid management system 240. In particular, client system 200 may send virtual job requests and jobs to grid management system 240 and grid management system 240 may respond with a grid offer and controls processing of grid jobs. Further, while in the present embodiment client system 200 is depicted as accessing grid environment 150 with a request, in alternate embodiments client system 200 may also operate within grid environment 150.

While the systems within virtual resource 160 are depicted in parallel, in reality, the systems may be part of a hierarchy of systems where some systems within virtual resource 160 may be local to client system 200, while other systems require access to external networks. Additionally, it is important to note, that client system 200 may physically encompass the systems depicted within virtual resources 160.

To implement grid environment 150, grid management system 240 facilitates grid services. Grid services may be designed according to multiple architectures, including, but not limited to, the Open Grid Services Architecture (OGSA). In particular, grid management system 240 refers to the management environment which creates a grid by linking computing systems into a heterogeneous network environment characterized by sharing of resources through grid services.

In one example, grid management system 240 may include multiple grid modules that perform grid services, such as an efficiency-based workload tracking agent, for receiving characteristics of the real-time workload on virtual resources 160, dividing the workload among current processes, and sampling the workload for new processes over a sampling period. In addition the efficiency-based workload tracking agent scans the samples for a new process to determine an operation based resource utilization threshold and stores the operation based resource utilization threshold so that other grid services can access the operation based resource utilization threshold and restrain the process to the threshold. Processes include, but are not limited to, a software application, an individual executable process, and a set of executable processes. A new process may include, but is not limited to, a newly detected process and a previously monitored process operating within a new execution environment.

Figure 3:
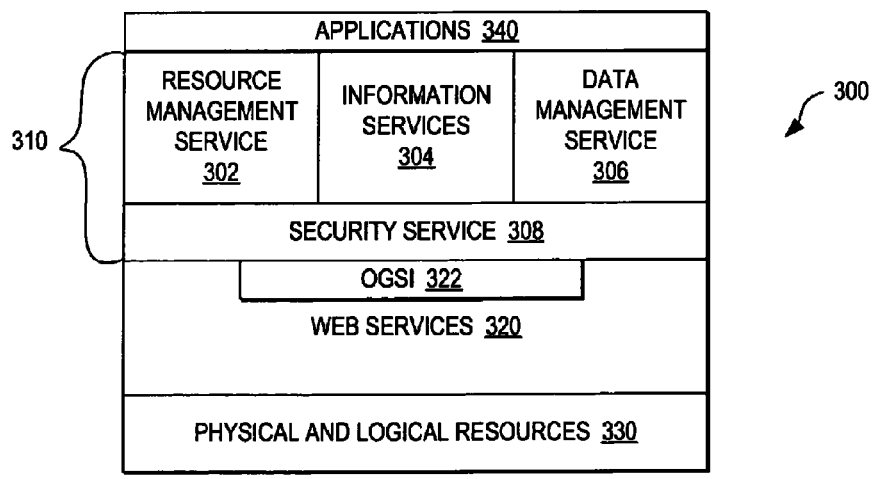
FIG. 3 is a block diagram depicting one example of an architecture that may be implemented in a grid environment.

Referring now to FIG. 3, a block diagram illustrates one example of an architecture that may be implemented in a grid environment. As depicted, an architecture 300 includes multiple layers of functionality. As will be further described, the present invention is a process which may be implemented in one or more layers of an architecture, such as architecture 300, which is implemented in a grid environment, such as the grid environment described in FIG. 2. It is important to note that architecture 300 is just one example of an architecture that may be implemented in a grid environment and in which the present invention may be implemented. Further, it is important to note that multiple architectures may be implemented within a grid environment.

Within the layers of architecture 300, first, a physical and logical resources layer 330 organizes the resources of the systems in the grid. Physical resources include, but are not limited to, servers, storage media, and networks. The logical resources virtualize and aggregate the physical layer into usable resources such as operating systems, processing power, memory, I/O processing, file systems, database managers, directories, memory managers, and other resources.

Next, a web services layer 320 provides an interface between grid services 310 and physical and logical resources 330. Web services layer 320 implements service interfaces including, but not limited to, Web Services Description Language (WSDL), Simple Object Access Protocol (SOAP), and extensible mark-up language (XML) executing atop an Internet Protocol (IP) or other network transport layer. Further, the Open Grid Services Infrastructure (OSGI) standard 322 builds on top of current web services 320 by extending web services 320 to provide capabilities for dynamic and manageable Web services required to model the resources of the grid. In particular, by implementing OGSI standard 322 with web services 320, grid services 310 designed using OGSA are interoperable. In alternate embodiments, other infrastructures or additional infrastructures may be implemented a top web services layer 320.

Grid services layer 310 includes multiple services that perform the functions described with reference to grid management system 240. For example, grid services layer 310 may include grid services designed using OGSA, such that a uniform standard is implemented in creating grid services. Alternatively, grid services may be designed under multiple architectures. Grid services can be grouped into four main functions. It will be understood, however, that other functions may be performed by grid services.

First, a resource management service 302 manages the use of the physical and logical resources. Resources may include, but are not limited to, processing resources, memory resources, and storage resources. Management of these resources includes scheduling jobs, distributing jobs, and managing the retrieval of the results for jobs. Resource management service 302 monitors resource loads and distributes jobs to less busy parts of the grid to balance resource loads and absorb unexpected peaks of activity. In particular, a user may specify preferred performance levels so that resource management service 302 distributes jobs to maintain the preferred performance levels within the grid.

Second, information services 304 manages the information transfer and communication between computing systems within the grid. Since multiple communication protocols may be implemented, information services 304 manages communications across multiple networks utilizing multiple types of communication protocols.

Third, a data management service 306 manages data transfer and storage within the grid. In particular, data management service 306 may move data to nodes within the grid where a job requiring the data will execute. A particular type of transfer protocol, such as Grid File Transfer Protocol (GridFTP), may be implemented.

Finally, a security service 308 applies a security protocol for security at the connection layers of each of the systems operating within the grid. Security service 308 may implement security protocols, such as Open Secure Socket Layers (SSL), to provide secure transmissions. Further, security service 308 may provide a single sign-on mechanism, so that once a user is authenticated, a proxy certificate is created and used when performing actions within the grid for the user.

Multiple services may work together to provide several key functions of a grid computing system. In a first example, computational tasks are distributed within a grid. Data management service 306 may divide up a computation task into separate grid services requests of packets of data that are then distributed by and managed by resource management service 302. The results are collected and consolidated by data management system 306. In a second example, the storage resources across multiple computing systems in the grid are viewed as a single virtual data storage system managed by data management service 306 and monitored by resource management service 302.

An applications layer 340 includes applications that use one or more of the grid services available in grid services layer 310. Advantageously, applications interface with the physical and logical resources 330 via grid services layer 310 and web services 320, such that multiple heterogeneous systems can interact and interoperate.

With reference now to FIG. 4, there is depicted a block diagram of an instances of a grid manager managing multiple resource nodes within a grid environment in accordance with the method, system, and program of the present invention. As illustrated, a grid manager (GM) 402 is a collection of grid services that manage multiple resource nodes 404, 406, 408 and 410. Grid management system 240 may include multiple GMs, such as GM 402, that individually manage selections of resource nodes from among the multiple resource nodes available in virtual resource 160.

In the example, GM 402 manages resource nodes 404 and 406 which are groupings of hardware resources, not allocated for use by a specific software resource. In addition, GM 402 manages DB2EE resource nodes 408 and 410 which are allocated and loaded with DB2EE software for processing database requirements of grid jobs.

DB2EE resource node 408 includes memory resources 412 and CPU resources 414. DB2EE resource node 410 includes memory resources 416 and CPU resources 418. It will be understood that for a resource node to support a particular type of software resource, the resource node will include a minimum amount of memory and CPU resources to support the software resource, however, that more than the minimum amount of memory and CPU resource may be available on a hardware platform. Further, it will be understood that other resources, such as network and other grid designated resources, may also be included in a resource node even though the examples depicted throughout show the utilization of memory and CPU resources.

Although not depicted, the resource nodes, such as DB2EE resource node 408, may include multiple hardware platforms. Each hardware platform supports at least one operating system. Within the operating system, software-based workload managers may manage the utilization of resources by processes on the hardware platform or across multiple hardware platforms. In one embodiment, software-based workload managers at the hardware platform level may call an application programming interface for a process to access the resource utilization thresholds set for the process. In addition, software-based workload managers at the hardware platform level may be passed the resource utilization thresholds from a grid service managing the hardware platforms within grid environment 150.

In one embodiment, GM 402 includes grid services that enable GM 402 to detect the total resources designated for each of resource nodes 404, 406, 408, and 410 and to cap use of the total resources at a standardized threshold for a temporary period of time. For example, the DB2EE software resource may include multiple processes or sets of processes, the execution of which requires resources, the amount of which is restricted to a standardized threshold. Without a cap on use of the total resources, a process may attempt to take as much of each resource as is currently available, even though it is not efficient to allow the process to utilize all available resources.

In addition, in one embodiment GM 402 includes grid services that enable GM 402 to learn the actual resource use by a process and teach the process about actual resource use within an execution environment, resource node, or other grouping of resources. As will be further described, the grid service may teach the process or the grid environment about actual resource use by the process so that other grid workload managers or hardware platform level workload managers can cap use of resources by the process according to the operation based resource utilization thresholds, rather than just according to standardized thresholds applied arbitrarily to processes.

Referring now to FIG. 5, there is depicted a block diagram of a grid management system for managing a grid environment in accordance with the method, system, and program of the present invention. In the example, grid management system 240 includes multiple grid modules that provide grid services and store data for access across grid environment 150. It is important to note that the grid modules described in grid management system 240 may be distributed among multiple grid managers within grid environment 150, such as GM 402 described in FIG. 4.

As depicted, grid management system 240 includes a resource allocation controller 510. Resource allocation controller 510 determines and allocates resources to build an execution environment for use by an incoming grid job received by grid management system 240. In particular, resource allocation controller 510 may build a resource node or a grouping of resource nodes to handle a particular grid job within grid environment 150. As described with reference to FIG. 4, a resource node may include at least a portion of at least one hardware platform running a particular process atop an operating system. Further, resource allocation controller 510 may allocate already built resource nodes running the software resources required to process the incoming grid job.

Next, a job router 508 within grid management system 240 controls routing of the job to the allocated selections of resource nodes. In one example, a grid job may include a batch of jobs that job router 508 distributes across a selection of resource nodes operating in parallel to handle the batch of jobs.

A workload tracker 512 tracks the actual resource use of each resource within grid environment 150. A grid workload manager 506 receives the actual resource use of each resource and matches the real-time workload use characteristics with the processes currently running to determine the resource use by each process.

An efficiency based workload manager (EBWLM) 504 accesses the workload use characteristics of a process using resources within grid environment 150 when EBWLM 504 determines that the process is new. EBWLM 504 determines the total amount of resources within the execution environment of the new process and sets standard based resource utilization thresholds for capping use of the total amount of resources by the new process. In one embodiment, EBWLM 504 detects the total amount of resources from workload tracker 512, resource allocation controller 510, or another grid service enabled to detect total resource availability.

Next, EBWLM 504 restricts the new process to resource use within the execution environment based on the standard based resource utilization thresholds. In addition, EBWLM 504 learns about the actual resource use of the process by recording samplings of the workload use characteristics over time. EBWLM 504 then determines operation based resource utilization thresholds for resource use by the new process and teaches the new process or grid management system 240 about the operation based resource utilization thresholds for resource use.

In one example, EBWLM 504 maintains resource utilizations thresholds for processes in resource utilization tables 502. Resource utilization tables 502 are accessible to multiple workload management modules within grid management system 240. For example, grid workload manager 506 manages resource use by grid jobs operating within grid environment 150 to only utilize an allocated amount of resources within grid environment 150.

In one embodiment, grid environment 150 includes multiple instances of grid workload manager 506, where each instance manages a geographically disparate grouping of resources within grid environment 150. Each of the instances of grid workload manager 506 would access resource utilization tables 502 to determine what resource utilization thresholds are set for the process. Then, each instance of grid workload manager 506 would restrict process resource use to the resource utilization thresholds.

In another embodiment, hardware platforms or server groupings within grid environment 150 may include workload managers that manage the utilization of resources within the hardware platform or server grouping. The local workload managers may communicate with grid management system 240 to access resource utilization tables 502.

In yet another embodiment, as described further with reference to FIG. 7, when EBWLM 504 updates a resource utilization threshold for a process, EBWLM 504 calls the application programming interface (API) of a process to update the process with the resource utilization thresholds. Then, any resource optimizer can call the API with a request for the resource utilization thresholds for a process.

In yet a further embodiment, a process may monitor its own resource use and restrict itself to the resource utilization thresholds set by EBWLM 504. In particular, a process may access its resource use from a workload tracking service, such as workload tracker 512, and adjust allocations for resource use within the process based on whether the current resource use exceeds the operation based resource utilization thresholds set by EBWLM 504.

In addition, it will be understood that grid workload manager 506 may include additional tools that focus on compressing and defragmenting memory to attempt to maximize the total available memory in grid environment 150. Further, a particular hardware platform may include software tools that compress and defragment memory to attempt to maximize the total available memory in the hardware platform.

With reference now to FIG. 6, there is depicted a block diagram of the components of an efficiency based workload manager (EBWLM) for learning resource use by a process and teaching the process thresholds for actual operation based use that are then available for regulating resource use by the process.

As illustrated, EBWLM 504 includes limits for new processes 604. Limits for new processes 604 designates the standard resource limits for resource use by processes. The limit may be specified according to type of process, type of resources, type of hardware platform, and other specifications that effect resource use. Limits for new processes 604 may be configured by a system administrator or configured based on the operating characteristics of a hardware platform over time.

In addition, EBWLM 504 includes a learning controller 608. When learning controller 608 detects a new process operating within an execution environment or hardware platform managed by EBWLM 504, learning controller 608 sets standardized thresholds for resource use by the process. In particular, learning controller 608 detects the total resource available within the execution-environment of the process and applies limits for new process 604 to determine the standard limit based resource utilization thresholds.

Next, learning controller 608 temporarily manages utilization of resources by the process, while sampling resource use over the temporary time period. Actual resource use samples are stored in resource use sample database 602.

Learning controller 608 then determines an operation based resource utilization threshold for the new process from the use samples by identifying the largest operational use of each resource during the sampling period. Advantageously, a sampling period is set to a length sufficient to detect operational variances is resource use by a process and detect an effective operation based resource utilization threshold for each type of resource.

In addition, EBWLM 506 includes a teaching controller 610 that teaches the new process the operation based resource utilization thresholds determined by learning controller 608. In particular, the teaching controller teaches a resource utilization state table for the process what the operation based resource use limits for the process are within the particular execution environment. In one example, resource utilization tables 502 are updated with the operation based resource utilization thresholds for use by grid workload manager 506 to manage the resource use of each process. In another example, as will be further described with reference to FIG. 7, teaching controller 610 may call an application programming interface (API) for a process to update the resource utilization state table associated with the process.

A current processes table 606 within EBWLM 504 is updated with the process and execution environment in which the process was monitored one teaching controller 610 finishes teaching the operation based resource utilization thresholds. Then learning controller 608 can refer to current processes table 606 to determine whether a process requesting resource use is a new process. A new process may include, but is not limited to, a newly loaded process and a process that was previously monitored in a different execution environment.

In the embodiment depicted, EBWLM 504 only manages and caps the resource use by a new process during the time that learning controller 608 samples actual operational use by the process and teaching controller 610 teaches the process or a workload manager for an execution environment about the operation based resource utilization thresholds for the process. However, in alternate embodiments, EBWLM 504 may continue to manage and cap resource use by the new process after teaching controller 610 determines the operation based resource utilization thresholds for the process.

Referring now to FIG. 7, there is depicted a block diagram of a process with a resource utilization state table that designates the thresholds for resource use by the process in accordance with the method, system, and program of the present invention. As depicted, a process 702 includes a process application programming interface (API) 704 and a resource utilization state table 706, in addition to the other executable files that a process requires (not depicted). In the example, EBWLM 504 can call process API 704 to update resource utilization state table 706 with resource utilization thresholds. In addition, EBWLM 504 and other workload managers can also call API 704 to access the data stored in resource utilization state table 706. In particular, EBWLM 504 and other workload managers that manage the amount of resources that a process can access while executing can call API 704 to access the current thresholds set in resource utilization state table 706 and hold process 702 to the current thresholds.

In one embodiment, standard limit based resource utilization thresholds are stored in resource utilization state table 706 while EBWLM 504 learns about actual resource use by process 702. Once EBWLM 504 finishes learning about actual resource use by process 702, EBWLM 504 determines the operation based resource utilization thresholds for the process operating within a particular execution environment and calls process API 704 to update resource utilization state table 706 with the operation based resource utilization thresholds.

Figure 8A:
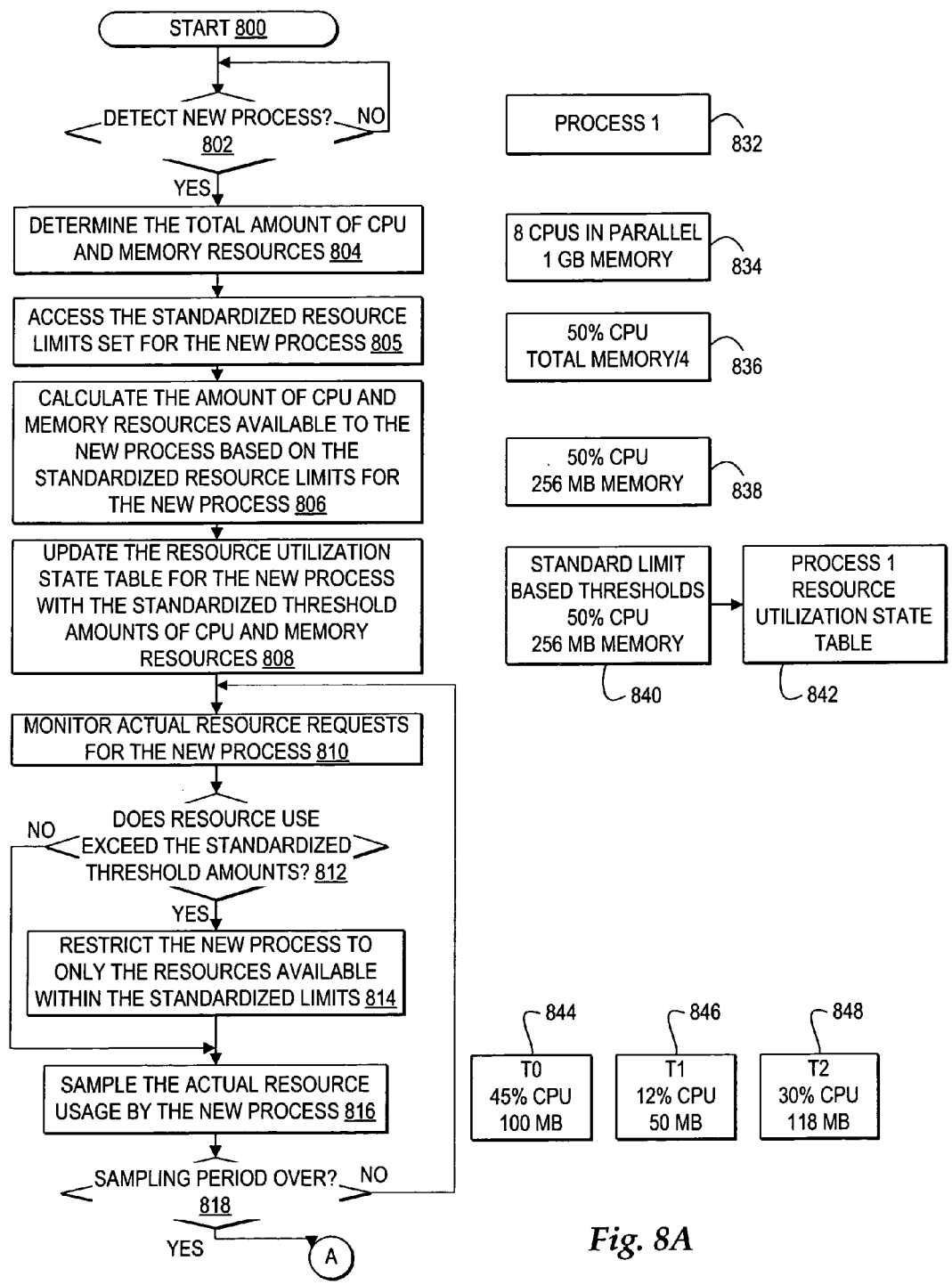
FIGS. 8A-8B depict a high level logic flowchart of a process and program for learning about process requirements for resources within a particular execution environment and teaching the process threshold resource requirements in accordance with the method, system, and program of the present invention.
Figure 8B:
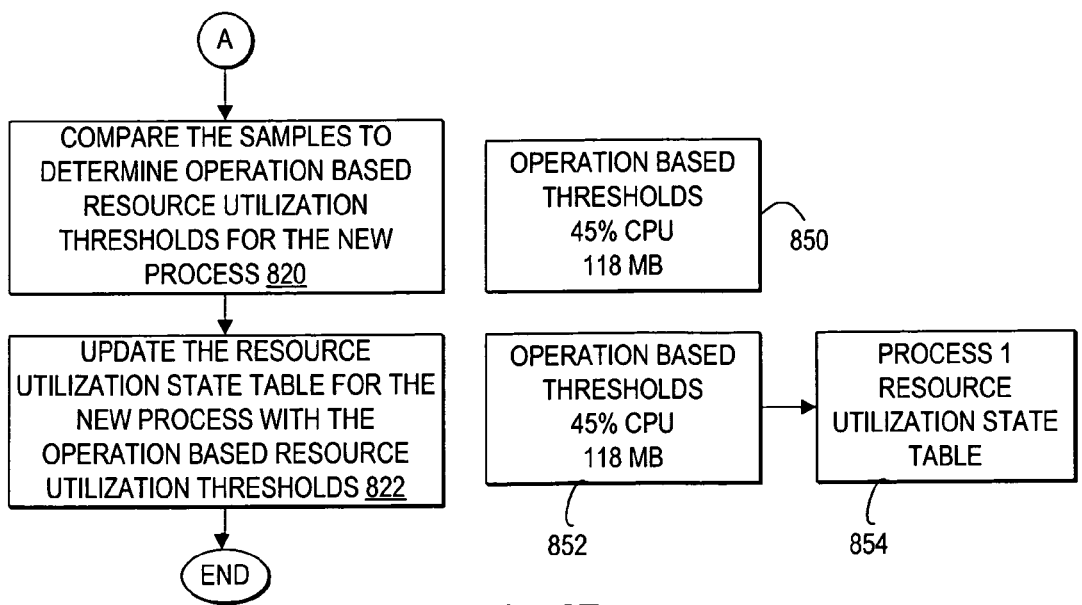

With reference now to FIGS. 8A-8B, there is depicted a high level logic flowchart of a process and program for learning about process requirements for resources within a particular execution environment and teaching the process threshold resource requirements in accordance with the method, system, and program of the present invention. As depicted, the process starts at block 800 and thereafter proceeds to block 802. Block 802 starts the learning process for the efficiency based workload manager. Block 802 depicts a determination whether the efficiency based workload manager detects a new process. When the efficiency based workload manager detects a new process, then the process passes to block 804. In an example that is carried throughout the description of the flowchart process, as illustrated at reference numeral 832, a new "process 1" is detected.

Block 804 depicts determining the total amount of CPU and memory resources available. In one embodiment, within a grid environment, the total amount of CPU and memory resources available may be within a particular execution environment available for the new process. In another embodiment, within a partitioned server environment, the total amount of CPU and memory resources available may be within a particular partition within the server environment. In the example, as illustrated at reference numeral 834, there are 8 CPUs available in parallel and 1 GB of memory available.

Next, block 805 depicts accessing the standard resource limits set for new processes. In the example, as depicted at reference numeral 836, the standard resource limits set for new processes are 50% of the total CPUs available and a fourth of the total memory available. In one embodiment, the efficiency based workload manager manages multiple execution environments within a grid environment, where standard resources limits for new processes or sets of processes are set according to execution environment and set according to type of process.

Thereafter, block 806 depicts calculating the threshold amount of CPU and memory resources available to the new process based on the standard resource limits set for new processes and the calculated total resources available. In the example, as depicted at reference numeral 838, the resource limits set for "process 1" based on the standard resource limits for new processes are 50% of the 8 CPUs in parallel and 256 MB of memory.

Next, block 808 depicts updating the resource utilization state table for the new process with the threshold amounts of CPU and memory resources calculated for the new process. In the example, as depicted at reference numeral 840, the standard limit based resource utilization thresholds calculated for "process 1" are 50% of the CPUs and 256 MB that are transferred, as illustrated at reference numeral 842, to the resource utilization state table for "process 1".

Thereafter block 810 depicts monitoring actual resource use for the new process as it executes. Next, block 812 illustrates a determination whether resource use exceeds the standard limit based resource utilization thresholds for the new process. If resource use does not exceed the standard limit based resource utilization thresholds, then the process passes to block 816. If resource use does exceed the standard limit based resource utilization thresholds, then the process passes to block 814. Block 814 depicts restricting the new process to only the resources available within the limits, and the process passes to block 816.

Block 816 illustrates sampling the actual resource use by the new process at period time intervals. In the example, as depicted at reference numerals 844, 846, and 848, samplings of resource use are taken at times "T0", "T1", and "T2". In the example, the sampling at T1 indicates the new process using 45% of the CPU availability and 100 MB of memory, at T2 using 12% of the CPU availability and 50 MB of memory, and at T3 using 30% of the CPU availability and 118 MB of memory.

Thereafter, block 818 depicts a determination whether the sampling period is over. If the sampling period is not over, then the process returns to block 810. If the sampling period is over, then the process passes to block 820. In particular, a configurable sampling time may be specified for use by the efficiency based workload manager. For example, the configurable sampling time may specify the taking of a sample every minute for five minutes. It will be understood that the sampling period should be short so that the efficiency based workload manager only needs to restrict resource use by the new process for a period of time sufficient to learn the actual how the process actually operates.

Next, block 820 illustrates comparing the samples to determine operation based resource utilization thresholds for resource use by the new process. In the example, as illustrated at reference numeral 850, the operation based resource utilization thresholds indicate a CPU threshold level of 45% of CPU availability and a memory threshold level of 118 MB of memory.

Thereafter, block 822 depicts updating the resource utilization state table for the new process with the operation based resource utilization thresholds, and the process ends. In the example, as depicted at reference numeral 852, the operation based-resource utilization thresholds are updated as depicted at reference numeral 854, within the resource utilization state table for "process 1". In one embodiment, the efficiency based workload manager calls an application programming interface for the process to control storage of the operation based resource utilization thresholds in the resource utilization state table for the process. Then, other workload managers can access the resource utilization state table to determine the resource thresholds for the process and to constrain the process to the resource thresholds. In addition, within a grid environment, operation based resource utilization thresholds may be stored in a location accessible to the workload manager for the grid environment.

While the invention has been particularly shown and described with reference to a preferred embodiment, it will be understood by those skilled in the art that various changes in form and detail may be made therein without departing from the spirit and scope of the invention.

What is claimed is:

1. A computer-implemented method for setting an operation based resource utilization threshold for capping resource use by a process within a grid environment, comprising:

sampling, using a processor, a plurality of actual resource use characteristics, wherein each of said plurality of actual resource use characteristics designates a portion of a total amount of system resources available to a process that are used by said process at a particular time over a sampling period, wherein said total amount of system resources are available in a grid environment;

responsive to detecting a conclusion of said sampling period, determining, using the processor, an operation based resource utilization threshold for said process based on a maximum resource use within said plurality of actual resource use characteristics; and storing, using the processor, said operation based resource utilization threshold for access by at least one workload manager that restricts said process to resource use within an execution environment of said grid environment managed by said workload manager up to said operation based resource utilization threshold by calling an application programming interface for said process with a request to store said operation based resource utilization threshold in a file accessible to said workload manager by calling said application programming interface with a request to load said operation based resource utilization threshold, such that said a resource utilization threshold is set for said process based on actual operation of said process.

2. The computer-implemented method according to claim 1 for setting an operation based resource utilization threshold for capping resource use by a process within a grid environment, further comprising:

detecting said total amount of system resources available to said process;

calculating a standard limit based resource utilization threshold based on a standard limit applied to said total amount of system resources available to said process; and restricting said process to use of said total amount of system resources as limited by said standard limit based resource threshold during said sampling period.

3. The computer-implemented method according to claim 1 for setting an operation based resource utilization threshold for capping resource use by a process within a grid environment, wherein sampling a plurality of actual resource use characteristics, further comprises:

receiving each of said plurality of actual resource use characteristics designating use of a total amount of system resources comprising at least one from among processor use, memory use, and network use.

4. The computer-implemented method according to claim 1 for setting an operation based resource utilization threshold for capping resource use by a process within a grid environment, wherein storing said operation based resource utilization threshold for access by at least one workload manager that restricts said process to resource use within an execution environment managed by said workload manager up to said operation based resource utilization threshold, further comprises:

storing said operation based resource utilization threshold specified for said process in a resource threshold table directly accessible to said at least one workload manager.

5. The computer-implemented method according to claim 1 for setting an operation based resource utilization threshold for capping resource use by a process within a grid environment, wherein said total amount of system resources available to said process are managed by said at least one workload manager managing said execution environment within a grid environment as a grid service.

6. The computer-implemented method according to claim 1 for setting an operation based resource utilization threshold for capping resource use by a process within a grid environment, wherein said total amount of system resources available to said process are managed by said at least one workload manager that manages said execution environment of at least one hardware platform.

7. A system for setting an operation based resource utilization threshold for capping resource use by a process within a grid environment, comprising:
   a plurality of processors;
   a grid environment comprising a plurality of system resources monitored by a grid service executing in at least one layer of said grid environment on at least one of said plurality of processors;
   said grid service further comprising:
   means for sampling a plurality of actual resource use characteristics, wherein each of said plurality of actual resource use characteristics designates a portion of a total amount of said plurality of system resources available to a process that are used by said process at a particular time over a sampling period, wherein said total amount of said plurality of system resources are available in said grid environment;
   means for responsive to detecting a conclusion of said sampling period, determining an operation based resource utilization threshold for said process based on a maximum resource use within said plurality of actual resource use characteristics; and
   means for storing said operation based resource utilization threshold for access by at least one workload manager that restricts said process to resource use within an execution environment of said grid environment managed by said workload manager up to said operation based resource utilization threshold by calling an application programming interface for said process with a request to store said operation based resource utilization threshold in a file accessible to said workload manager by calling said application programming interface with a request to load said operation based resource utilization threshold, such that said a resource utilization threshold is set for said process based on actual operation of said process.

8. The system according to claim 7 for setting an operation based resource utilization threshold for capping resource use by a process within a grid environment, said grid service further comprising:
   means for detecting said total amount of said plurality of system resources available to said process;
   means for calculating a standard limit based resource utilization threshold based on a standard limit applied to said total amount of said plurality of system resources available to said process; and
   means for restricting said process to use of said total amount of system resources as limited by said standard limit based resource threshold during said sampling period.

9. The system according to claim 7 for setting an operation based resource utilization threshold for capping resource use by a process within a grid environment, wherein said means for sampling a plurality of actual resource use characteristics, further comprises:
   means for receiving each of said plurality of actual resource use characteristics designating use of a total amount of said plurality of system resources comprising at least one from among processor use, memory use, and network use.

10. The system according to claim 7 for setting an operation based resource utilization threshold for capping resource use by a process within a grid environment, wherein said means for storing said operation based resource utilization threshold for access by at least one workload manager that restricts said process to resource use within an execution environment managed by said workload manager up to said operation based resource utilization threshold, further comprises:
   means for storing said operation based resource utilization threshold specified for said process in a resource threshold table directly accessible to said at least one workload manager.

11. The system according to claim 7 for setting an operation based resource utilization threshold for capping resource use by a process within a grid environment, wherein said total amount of said plurality of system resources available to said process are managed by said at least one workload manager managing said execution environment within a grid environment as a workload manager grid service.

12. The system according to claim 7 for setting an operation based resource utilization threshold for capping resource use by a process within a grid environment, wherein said total amount of said plurality of system resources available to said process are managed by said at least one workload manager that manages said execution environment of at least one hardware platform.

13. A computer program product, residing on a volatile or non-volatile computer readable storage medium, for setting an operation based resource utilization threshold for capping resource use by a process within a grid environment, comprising:
   means for controlling sampling of a plurality of actual resource use characteristics, wherein each of said plurality of actual resource use characteristics designates a portion of a total amount of system resources available to a process that are used by said process at a particular time over a sampling period, wherein said total amount of system resources are available in a grid environment;
   means for determining an operation based resource utilization threshold for said process based on a maximum resource use within said plurality of actual resource use characteristics, responsive to detecting a conclusion of said sampling period; and
   means for enabling storage of said operation based resource utilization threshold for access by at least one workload manager that restricts said process to resource use within an execution environment of said grid environment managed by said workload manager up to said operation based resource utilization threshold by calling an application programming interface for said process with a request to store said operation based resource utilization threshold in a file accessible to said workload manager by calling said application programming interface with a request to load said operation based resource utilization threshold.

14. The computer program product according to claim 13 for setting an operation based resource utilization threshold for capping resource use by a process within a grid environment, further comprising means for enabling detection of said total amount of said plurality of system resources available to said process;

means for calculating a standard limit based resource utilization threshold based on a standard limit applied to said total amount of said plurality of system resources available to said process; and means for controlling restriction of said process to use of said total amount of said plurality of system resources as limited by said standard limit based resource threshold during said sampling period.

15. The computer program product according to claim 13 for setting an operation based resource utilization threshold for capping resource use by a process within a grid environment, wherein said means for controlling sampling of a plurality of actual resource use characteristics, further comprises:

means for enabling receipt of each of said plurality of actual resource use characteristics designating use of a total amount of said plurality of system resources comprising at least one from among processor use, memory use, and network use.

16. The computer program product according to claim 13 for setting an operation based resource utilization threshold for capping resource use by a process within a grid environment, wherein said means for enabling storage of said operation based resource utilization threshold for access by at least one workload manager that restricts said process to resource use within an execution environment managed by said workload manager up to said operation based resource utilization threshold, further comprises:

means for enabling storage of said operation based resource utilization threshold specified for said process in a resource threshold table directly accessible to said at least one workload manager.

* * * * *